US009535602B2

(12) United States Patent
Gutentag et al.

(10) Patent No.: US 9,535,602 B2
(45) Date of Patent: Jan. 3, 2017

(54) SYSTEM AND METHOD FOR PROMOTING CONNECTIVITY BETWEEN A MOBILE COMMUNICATION DEVICE AND A VEHICLE TOUCH SCREEN

(71) Applicant: BNC Systems Ltd., Yokneam (IL)

(72) Inventors: Oded Gutentag, Ramat Yishay (IL); Haggay Tavyumi, Rishon Lezion (IL)

(73) Assignee: BNC Systems Ltd., Yokneam (IL)

( * ) Notice: Subject to any disclaimer, the term of this patent is extended or adjusted under 35 U.S.C. 154(b) by 197 days.

(21) Appl. No.: 13/942,094

(22) Filed: Jul. 15, 2013

(65) Prior Publication Data
US 2015/0019967 A1    Jan. 15, 2015

(51) Int. Cl.
*G06F 3/14*    (2006.01)
*G06F 3/0488*    (2013.01)
(Continued)

(52) U.S. Cl.
CPC ........... *G06F 3/04883* (2013.01); *B60K 35/00* (2013.01); *B60K 37/02* (2013.01); *G06F 3/0488* (2013.01); *G06F 3/04842* (2013.01); *G06F 3/1454* (2013.01); *H04M 1/0202* (2013.01); *H04W 76/02* (2013.01); *G06F 2203/038* (2013.01); *G06F 2203/0383* (2013.01)

(58) Field of Classification Search
CPC ...... G11B 27/34; H04N 5/44543; G06F 3/048
USPC .......................................................... 715/719
See application file for complete search history.

(56) References Cited

U.S. PATENT DOCUMENTS 8,482,535 B2    7/2013    Pryor
2008/0133084 A1    6/2008    Weinmann
(Continued)

FOREIGN PATENT DOCUMENTS

CN    202358004    8/2012
CN    203057274    7/2013
(Continued)

OTHER PUBLICATIONS

International Search Report for International Application No. PCT/IL2014/050631 mailed Sep. 14, 2014.

*Primary Examiner* — Angie Badawi
(74) *Attorney, Agent, or Firm* — May Patents Ltd.

(57) ABSTRACT

Systems and methods for promoting connectivity between a mobile communication device having a touch screen and a vehicle touch screen installed in a vehicle are disclosed. According to an embodiments, a system may include a controller configured to: connect to the mobile communication device and to the vehicle touch screen. The controller may also be configured to receive video signal of a current screen video image shown on the touch screen of the mobile communication device and transmit the current video image to the vehicle touch screen, causing a corresponding video image of the current screen video image to be displayed on the vehicle touch screen. The controller may further be configured to receive a signal indicative of a touch action that was performed on the vehicle touch screen, and cause the mobile communication device to respond as if a touch action corresponding to the touch action that was performed on the vehicle touch screen was performed on the touch screen of the mobile communication device.

18 Claims, 3 Drawing Sheets

(51) Int. Cl.
*G06F 3/0484* (2013.01)
*H04M 1/02* (2006.01)
*H04W 76/02* (2009.01)
*B60K 35/00* (2006.01)
*B60K 37/02* (2006.01)

(56) References Cited

U.S. PATENT DOCUMENTS

| | | | | |
|---|---|---|---|---|
| 2009/0171529 | A1* | 7/2009 | Hayatoma | 701/36 |
| 2010/0210315 | A1* | 8/2010 | Miyake | 455/569.2 |
| 2010/0280737 | A1* | 11/2010 | Ewert et al. | 701/102 |
| 2012/0278507 | A1* | 11/2012 | Menon et al. | 709/248 |
| 2013/0106750 | A1* | 5/2013 | Kurosawa | 345/173 |

FOREIGN PATENT DOCUMENTS

| | | |
|---|---|---|
| FR | 2953950 | 6/2011 |
| GB | 2492789 | 1/2013 |
| KR | 20100070092 | 6/2010 |
| WO | WO/2012/138201 | 10/2012 |

* cited by examiner

SYSTEM AND METHOD FOR PROMOTING CONNECTIVITY BETWEEN A MOBILE COMMUNICATION DEVICE AND A VEHICLE TOUCH SCREEN

FIELD OF THE INVENTION

Embodiments of the present invention relate to connectivity of a mobile phone and in particular of a smartphones to a built-in media center of a vehicle and in particular to a touch sensitive screen (hereinafter—"touch screen") of such built-in media center.

BACKGROUND OF THE INVENTION

Many vehicle manufacturers provide nowadays their manufactured vehicles with a built-in media center, which includes, inter-alia, a touch screen. Such touch screen is typically installed in the dashboard of the vehicle, so as to allow the driver and the passenger seated next to the driver to operate the media center by inputting operation commands using the touch screen.

Typically media centers offer the driver and the passengers of the vehicle information and entertainment (often called in short "infotainment"). This may include presenting various driving and/or vehicle parameters, such as the pressure status of the tires, gear status, etc., providing video (e.g. presenting rear camera view upon shifting the gear to reverse the vehicle), displaying navigational information, such as a map with navigational indications, etc.

Various arrangements were introduced to allow connectivity between a mobile phone and the media center of a vehicle, and in particular connectivity between a mobile phone and the screen of such a media center.

For example, US patent application publication No. 2008/133084 (Weinmann et al.), disclosed a communication system of a motor vehicle that includes a vehicle operating unit, a vehicle output unit, and an interface computer. The interface computer is connected to the vehicle operating unit and the vehicle output unit. The interface computer is implemented for the purpose of connecting a mobile terminal to the vehicle operating unit and the vehicle output unit such that information from the mobile terminal is displayable on the vehicle output unit and the mobile terminal is operable via the vehicle operating unit.

In International Patent Publication WO/2012/138201 (Lim et al.), there was disclosed a connection device for applying functions of a mobile phone to a vehicle, which embodies a connection configuration for interconnecting a mobile device and an audio-video (A/V) system of the vehicle such that the functions of the mobile device, such as image output, hands-free communication, the camera, and navigation (GPS) can be interlinked to the A/V system of the vehicle, a driver may easily operate each function of the mobile phone using a vehicle monitor, and functions of the camera, navigation and the like may be performed by the mobile phone even when such functions are not installed in the vehicle. To this end, a connection device for applying the functions of a mobile phone to a vehicle involves interconnecting the mobile phone and an A/V device of the vehicle so as to relay content to one another, operate the functions of the mobile phone in the vehicle, and enable the content being displayed on the mobile phone to be displayed on a monitor installed in the vehicle. The connection device includes a cradle in which the mobile phone having a touch-switching function is placed; an electromagnetic-wave touch module, which is arranged within the cradle in which the mobile phone is placed, such that the electromagnetic-wave touch module faces the touch-switching display of the mobile phone, wherein the electromagnetic-wave touch module converts, upon the occurrence of a touch signal on the monitor installed in the vehicle, a value of touch coordinates of the monitor of the vehicle to the value of touch coordinates corresponding to the size of the display of the mobile phone, and emits electromagnetic waves to the corresponding point on the display of the mobile phone placed in the cradle so as to perform the touch-switching function of the mobile phone; and a data-processing unit electrically connected to the mobile phone and to the A/V device of the vehicle so as to convert, when the switching function is performed in the mobile phone placed in the cradle by the electromagnetic-wave touch module, the drive data to be processed in the mobile phone into data that can be processed in the A/V device of the vehicle, and output the converted data to check a state of operating and driving the mobile phone via the monitor of the vehicle.

In UK patent application, published as GB2492789 (to Denso Corp. of Japan) a display duplication apparatus for a vehicle was disclosed, such that regions of a display of a mobile device may be replicated to one or more display of a vehicle. The apparatus includes an input connected to receive a display signal from a portable device (e.g. a mobile phone, smart phone or PDA) and a first display configured to display an invitation for input to define a selected interface region from a display output of the portable device. The first display is further configured to display an invitation for input to define a target display location of the vehicle and the apparatus can further include a number of displays, configured to display a selected interface region at a defined target display location of the vehicle. Regions of the portable device's display may be selected by touch (defining the region), though a template, by cursor control or by voice control. A target display such as a head-up display may then be selected.

French patent application published as FR2953950 (El Khoury) there was disclosed a touch screen for use in motor vehicle to control e.g. navigational function. The screen has a touch surface for displaying data and for inputting commands by a user. An interface having a Bluetooth 3.0 type wireless connection connects the screen to a mobile phone. A processing unit transfers the commands that are input on the surface to the mobile phone for controlling the mobile phone. The processing unit displays the data displayed by the mobile phone, on the touch surface. An audio output connects the screen to an audio device of a motor vehicle.

In KR20100070092 there was disclosed a method for driving a mobile telecommunication device using a navigation apparatus to use a mobile telecommunication device conveniently in various ways by using a monitor of a heterogeneous device as an input unit. Data for the cell coordinates of a navigation touch screen is matched with the cell coordinates of a mobile phone touch screen. When the touch input happens on a navigation touch screen, the cell coordinates of the touched point is transmitted to a cellular phone through an input/output interface. The received cell coordinate is recognized as the cell coordinates of the mobile phone touch screen and is displayed through the navigation monitor.

U.S. Pat. No. 8,482,535 (Pryor) discloses methods and apparatus particularly suited for applications in a vehicle, to provide a wide range of information, and the safe input of data to a computer controlling the vehicle subsystems or "Telematic" communication using for example GM's "ONSTAR" or cellular based data sources. Preferred embodiments utilize new programmable forms of tactile touch screens and displays employing tactile physical selection or adjustment means which utilize direct optical data input. A revolutionary form of dashboard or instrument panel results which is stylistically attractive, lower in cost, customizable by the user, programmable in both the tactile and visual sense, and with the potential of enhancing interior safety and vehicle operation. Non-automotive applications of the invention are also disclosed, for example means for general computer input using touch screens and home automation systems.

An object, according to embodiments of the present invention, is to provide such connectivity between a mobile communication device, and in particular a smartphone, to a touch screen (e.g. of a media center) of a vehicle, so as to present on the touch screen of the vehicle a video showing a current screen of the smartphone, similar to the screen shown on the display of the smartphone, and to allow full operation of the smartphone by inputting touch commands on the touch screen of the vehicle.

Further objects and advantages of embodiments of the present invention will become apparent after reading the present specification and considering the accompanying drawings.

SUMMARY OF THE INVENTION

There is thus provided, in accordance with embodiments of the present invention, a system for promoting connectivity between a mobile communication device having a touch screen and a vehicle touch screen installed in a vehicle. The system may include a controller configured to connect to the mobile communication device and to the vehicle touch screen. The controller may also be configured to receive video signal of a current screen video image shown on the touch screen of the mobile communication device and transmit the current video image to the vehicle touch screen, causing a corresponding video image of the current screen video image to be displayed on the vehicle touch screen. The controller may further be configured to receive a signal indicative of a touch action that was performed on the vehicle touch screen, and cause the mobile communication device to respond as if a touch action corresponding to the touch action that was performed on the vehicle touch screen was performed on the touch screen of the mobile communication device.

According to embodiments of the present invention, the system may further include a switching unit to switch a live link to the vehicle touch screen between the mobile communication device and a video source of the vehicle.

In some embodiments the switching unit may be further configured to provide live link concurrently from the mobile communication device and a video source of the vehicle.

According to embodiments of the invention the controller may be configured to operate the switching unit.

In some embodiments the controller may be configured to intercept communications from one or a plurality of vehicle communication buses of the vehicle.

In some embodiments said one or a plurality of vehicle communication buses may be selected from the group consisting of: Engine Control Module (ECM), transmission bus, airbags bus, antilock braking systems bus, cruise control bus, electric power steering bus, media bus, windows bus, doors bus, and mirror adjustment bus.

According to embodiments of the invention the controller may be further configured to interpret from the intercepted communications a sensed condition as an operation command for the mobile communication device, and cause the mobile communication device to perform that operation command.

In some embodiments the controller may be configured to forward information related to the vehicle to the mobile communication device.

According to some embodiments the controller may be configured to interpret from the intercepted communications an operation of one or a plurality of human-machine interface devices of the vehicle as an operation command for the mobile communication device, and cause the mobile communication device to perform that operation command.

According to some embodiments there is provided a method of promoting connectivity between a mobile communication device having a touch screen and a vehicle touch screen installed in a vehicle. The method may include connecting a controller to the mobile communication device and to the vehicle touch screen. The method may also include receiving video signal of a current screen video image shown on the touch screen of the mobile communication device and transmitting the current video image via the controller to the vehicle touch screen, causing a corresponding video image of the current screen video image to be displayed on the vehicle touch screen. The method may further include receiving by the controller a signal indicative of a touch action that was performed on the vehicle touch screen, and causing the mobile communication device to respond as if a touch action corresponding to the touch action that was performed on the vehicle touch screen was performed on the touch screen of the mobile communication device.

According to some embodiments there is provided a method that includes intercepting using a controller communications from one or a plurality of vehicle communication buses of a vehicle.

In some embodiments that method may further include forwarding information related to the vehicle to a mobile communication device connected to the controller.

DETAILED DESCRIPTION OF THE INVENTION

Figure 1:
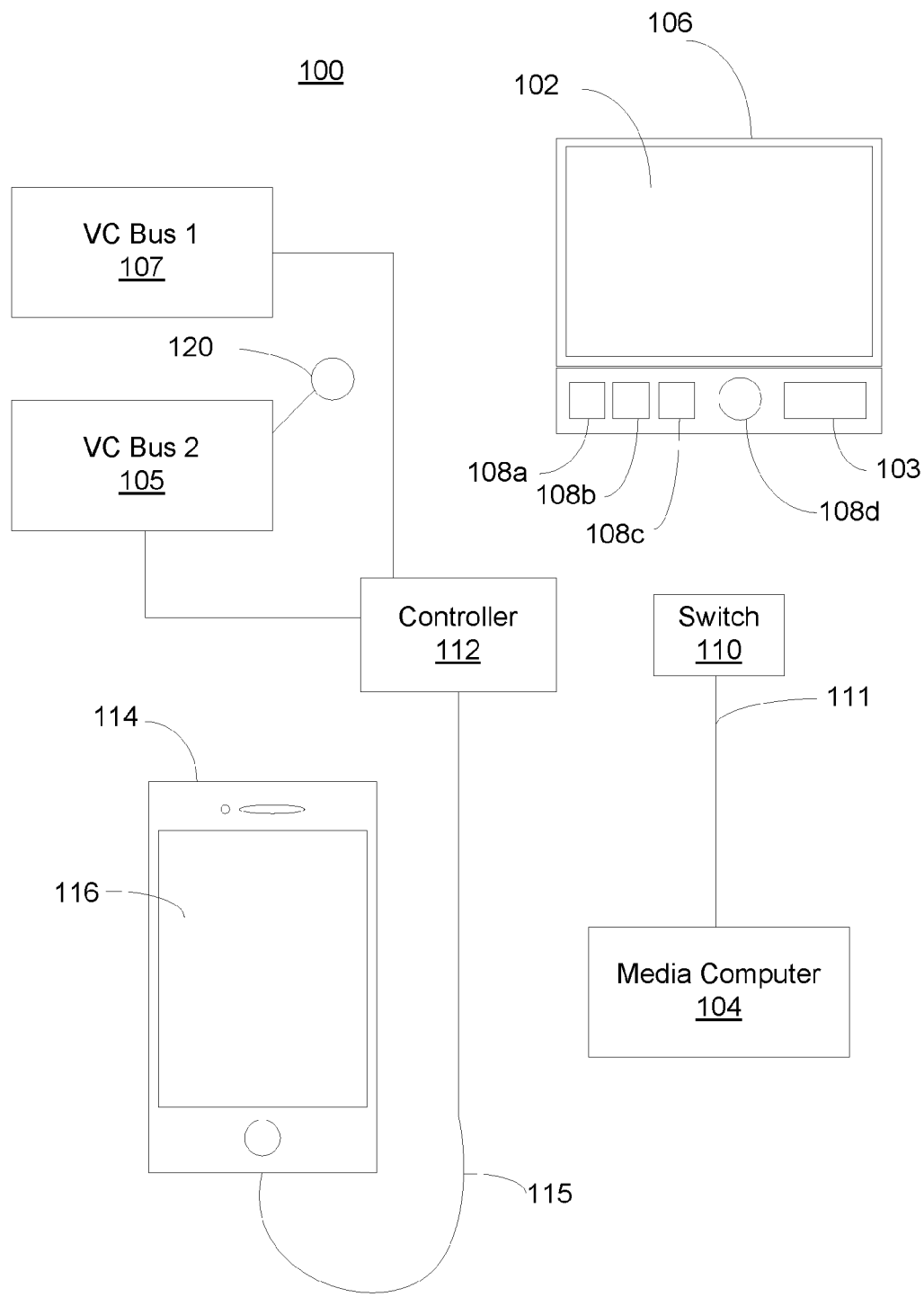
FIG. 1 illustrates a system for promoting connectivity between a smartphone and a touch screen of a vehicle, in accordance with an embodiment of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Embodiments of the present invention relate to systems and methods for promoting connectivity between a mobile communication device and a touch screen of a vehicle (hereinafter—"vehicle touch screen"). In the context of the present invention a "mobile communication device" refers to any portable communication device that has a touch screen on which a graphical user interface is displayed, and on which a user may input information and/or commands (hereinafter—"commands" for short), such as, for example a smartphone (e.g. iphone™ operated by iOS, manufactured and distributed by Apple™, and Android based smartphones, such as, for example, Galaxy™ manufactured and distributed by Samsung™, and the like).

Typically a vehicle touch screen is a component of a media center unit that is provided as a standard in many vehicles (particularly in high-end cars, but increasingly in many other mid-range and even low-end cars and other vehicles). The vehicle touch screen is typically designed by vehicle makers to present the driver and passengers of the vehicle with infotainment, such as, for example, navigation information, local and/or driving conditions (e.g. outside temperature, inside temperature, air-condition status, inflation pressure of tires, etc.). In some vehicles that include, as standard, a rear (and/or front) camera, the vehicle touch screen is used for displaying video acquired by that camera, either upon receiving a user induced command (e.g. user operating a selector button and selecting viewing video using the camera) or automatically upon detection of setting the gear in reverse mode.

According to embodiments of the present invention systems and methods for promoting connectivity between a mobile communication device (hereinafter—"smartphone" for brevity) and a vehicle touch screen.

In essence, a controller is used as a mediator between the vehicle touch screen and the smartphone. The controller is designed to forward video signal that includes a current screen video image shown on the touch screen of the smartphone so as to present that video image on the vehicle touch screen. The controller is also designed to receive signals from the vehicle touch screen indicative of touch actions sensed on that screen and forward these signals to the smartphone such that the smartphone is made to respond to these touch actions as if they were performed on the touch screen of that smartphone.

A touch action, in the context of the present specification, refers to, unless specifically indicated otherwise, any action performed over the touch screen, e.g. pressing, sliding, tapping, etc.

In some embodiments of the present invention any other action that was performed by a user on any button associated with the vehicle touch screen, or associated with another element of the vehicle electronic system, may be sensed by the controller and interpreted by the controller as an operation command to activate the smartphone in a predetermined manner. An "operation command" in the context of the present specification may refer to any operation command in the broadest scope of that term, e.g. an activation of a program, input of a command or data, displaying of information or graphical data on the screen of the smartphone, generating an audio signal, etc.

The controller may be designed to convert the format and/or resolution of the video signal received from the smartphone to the appropriate video format and/or resolution that the vehicle touch screen can use.

The controller would typically include a switching unit that would be installed on a communication line between the media computer of the vehicle and the vehicle touch screen, so as to allow the controller to switch a live link to the vehicle touch screen between the media computer and the smartphone (via the controller).

Reference is made to the figures.

FIG. 1 illustrates a system 100 for promoting connectivity between a smartphone 114 and a touch screen 106 of a vehicle, in accordance with an embodiment of the present invention. Vehicle touch screen 106 may include a touch sensitive surface 102 which is sensitive to touching. When the touch sensitive surface 102 is touched, a signal is generated which may be interpreted by a controller 103 of the vehicle touch to determine the exact position on the touch sensitive surface 102 that was touched. Vehicle touch screen 106 may include Human-Machine Interface (HMI) devices, such as, for example, buttons, switches, selectors and/or other HMI devices 108a-108d (hereinafter—"buttons", e.g. physical, mechanical buttons or virtual touch sensitive areas that are designated to act as buttons).

Touch screen 106 is typically connected by wiring 111 (e.g. a wire or a plurality of wires) to a video source of the vehicle (e.g. media computer 104 of the vehicle).

System 100 typically includes a controller 112 and a switching unit 110 connected to controller 112.

Controller 112 is designed to allow a user to connect their smartphone 114 to the controller via communication cable 115 (e.g. a USB cable, which may also serve to charge the smartphone's rechargeable power source).

Switching unit 110 is designed to be connected to wiring 111 that links media computer 104 to vehicle touch screen 106. This may require severing wiring 111 (e.g. cutting of the wiring) and connecting switching unit 110 in between so that it may switch a live link to vehicle touch screen 106 between media computer 104 and smartphone 114 via controller 112 so as to determine the feed source for the vehicle touch screen. Controller 112 is designed to issue switching commands to switching unit 110 to select the feed source for vehicle touch screen 106 (either media computer 104 or controller 112). In some embodiments of the present invention the switching unit 110 would concurrently provide live video link from both sources (media computer 104 or controller 112) to be displayed on the vehicle touch screen (e.g. using picture in picture—PIP—video method).

In some embodiments of the present invention controller 112 may be designed to select a live link between smartphone 114 and vehicle touch screen 106, when smartphone 114 is connected to controller 112 (e.g. when communication cable 115 connected to controller 112 is plugged to the smartphone). In some embodiments of the present invention the user may manually select to activate a live link between smartphone 114 and vehicle touch screen 106.

Many smartphones (e.g. iphones, many Android based smartphones) are designed to automatically generate a video signal containing video image of a current screen display content of that smartphone when connected to a communication cable. Other smartphone may require setting up to facilitate the generation of such video signal. The video signal is transmitted from smartphone 114 to controller 112 via communication cable 115.

In some embodiments of the present invention controller 112 may be designed to convert the video signal of the current smartphone screen generated by smartphone 114 to the appropriate video format or formats and/or the appropriate video resolution using a video processor.

For that aim, in some embodiments of the present invention controller 112 is designed to automatically determine the type of touch screen of the vehicle. This may be facilitated, for example by listening or otherwise sensing the communications between media computer 104 and vehicle touch screen 106 and identifying the vehicle model and determining the type of touch screen based on the identification of the vehicle model, or otherwise identifying the touch screen type and the video formats and/or video resolution suitable for that screen. In some embodiments of the present invention a user may be required to set up the controller or otherwise select the appropriate video format or formats appropriate for that particular vehicle touch screen 106.

Controller 112 may cause switching unit 110 to maintain a live link between smartphone 114 and vehicle touch screen 106, so that the video of the current smartphone screen is displayed on the vehicle touch screen 106.

In order to facilitate operation of the smartphone via the vehicle touch screen signals indicative of a location touched on the touch sensitive surface 102 of vehicle touch screen 106, which are generated by controller 103, may be interpreted by controller 112 to a corresponding position on the touch screen 116 of smartphone 114 and forwarded to smartphone 114. In some embodiments of the present invention the interpreted corresponding location on the touch screen 116 of smartphone 114 may be used by the operating system of smartphone 116 to activate the smartphone as if the corresponding location on the touch screen 116 of smartphone 114 was actually pressed. In some other embodiments a dedicated application would be designed to run on smartphone 114 to facilitate that activation.

In some embodiments of the present invention corresponding mapping of the smartphone screen 116 and of the vehicle touch screen 106 may be required. In some embodiments a transformation function would be used to match the position pressed on the vehicle touch screen 106 with the corresponding position on the smartphone touch screen 116. The orientation of the vehicle touch screen 106 and of the touch screen of the smartphone may be considered and correlated. While it is likely that vehicle touch screen 106 be fixed and its reorientation impossible, the orientation of the smartphone may be determined and changed by the user. Thus information on the orientation of the smartphone screen may be useful in transforming the location on the vehicle touch screen that was pressed to the corresponding location on the smartphone screen.

In some embodiments of the present invention the orientation of the smartphone may be determined and taken in account in the transformation function. In other embodiments the user may be instructed to place the smartphone in a specific orientation (e.g. landscape or portrait) so as to facilitate simpler transformation.

Using wired connections as described in the present specification, and employing simple yet accurate transformation function may result in a very efficient and fast operation of the smartphone via the vehicle touch screen. In some embodiments of the present invention practically on-line operation may be achieved, as a result of very fast response times (typically of one or a few milliseconds), as opposed to slower wireless communication formats.

In some embodiments of the present invention the switching between media computer 104 and smartphone 114 via controller 112, carried out by switching unit 110, may be designed to be automatic, when certain predetermined condition or conditions are met. For example, controller 112 may be designed to maintain a live link between smartphone 114 and vehicle touch screen 106, and override that live link by switching the live link to media computer 104 when the gear of the vehicle is shifted to reverse mode, so as to allow video from a rear camera that is provided via media computer 104 to be displayed on vehicle touch screen 106. In some embodiments of the present invention controller 112 may be designed to hide the smartphone screen that is displayed on the vehicle touch screen to prevent driver distraction. In some such embodiments the hiding of the smartphone screen may be carried out manually (e.g. by the driver or a passenger). In some other such embodiments the smartphone screen would be hidden automatically by controller 112, for example, when specific predetermined driving scenario and/or vehicle state is determined (e.g. sensed or otherwise determined). For example, if the vehicle is braked urgently once or a plurality of times (indicating a possible negligence of the driving conditions by the driver), the controller may be designed to detect this state and hide the smartphone screen from the vehicle touch screen.

In some other embodiments the switching may be manual. In some embodiments of the present invention the switching unit may be designed to facilitate both manual and automatic switching.

In some embodiments of the present invention controller 112 may be designed to interpret pressing or otherwise operating an HMI device, e.g. a button or a plurality of buttons of buttons 108*a*-108*d* as a predetermined command. Thus, for example, pressing and holding the volume button (e.g. button 108*b*) of touch screen for a minimal period of time (e.g. 3 seconds) may be interpreted to increase (or decrease) the volume of audio signal generated by smartphone 114, or to activate the mute state of the smartphone. Similarly other functions associated with the smartphone operation may be assigned to one or a plurality of buttons of the vehicle touch screen. In some embodiments of the present invention user customization of such buttons may be offered.

Moreover, operation of other buttons of the vehicle (e.g. window control buttons, mirror adjustment buttons, air-conditioning operation buttons, etc.) may be detected by controller 112 (for example by listening, or otherwise sensing communications associated with one or a plurality of VC buses) and interpreted in a predetermined manner. In some embodiments user customization of these buttons may be offered.

Controller 112 may be designed to listen to or otherwise sense communications between various vehicle communication (VC) buses (e.g. 105, 107) of the electronic system of the vehicle.

Example of VC buses may include Controller Area Network (CAN) buses that are typically present in a vehicle. CAN bus is a vehicle bus standard designed to allow microcontrollers and other devices to communicate with each other within a vehicle, without the need of a host computer. CAN bus operates as a message-based protocol, specifically designed for automotive applications (although other applications may be found that use CAN buses). A vehicle may typically have dozens of processors—usually referred to as Electronic Control Units (ECUs)—designed for various subsystems. Typically the biggest processor is the Engine Control Module (ECM). Other processors may be used for transmission, airbags, antilock braking systems (ABS), cruise control, electric power steering, audio systems, windows, doors, mirror adjustment, battery and recharging systems in hybrid or electric vehicles, etc. Some ECUs form independent subsystems, but for most communications among them are essential. A subsystem may require controlling actuators or receiving sensor signals. The CAN standard was primarily developed to meet that need.

In some embodiments of the present invention controller 112 is designed to listen to communications of a single or a plurality of VC buses so as to be able to receive and/or determine various parameters, states and/or any information associated with the vehicle (hereinafter—information associated with the vehicle). For example, controller 112 may be designed to identify shifting between various vehicle gear states, identify closing and/or opening of a window or windows and or door or doors of the vehicle. Identifying or determining the current state or values of parameters associated with the vehicle may be used in an algorithm for operating controller 112 and/or switching unit 110.

In some embodiments of the present invention, the information associated with the vehicle may be processed or otherwise used by the smartphone. For example, the information associated with the vehicle may be displayed on the screen of the smartphone and/or on the vehicle touch screen. In some embodiments of the present invention an application running on the smartphone may process or otherwise use the information associated with the vehicle.

In some embodiments of the invention the information associated with the vehicle may include HMI device inputs, vehicle diagnostics, vehicle energy and fuel consumption, driver behavior, sensors information (for example, from tire pressure to number and identity of passengers in the vehicle), GPS location data, vehicle operational parameters, such as, for example, velocity, breaking, steering wheel angle, gear, etc.

Figure 2:
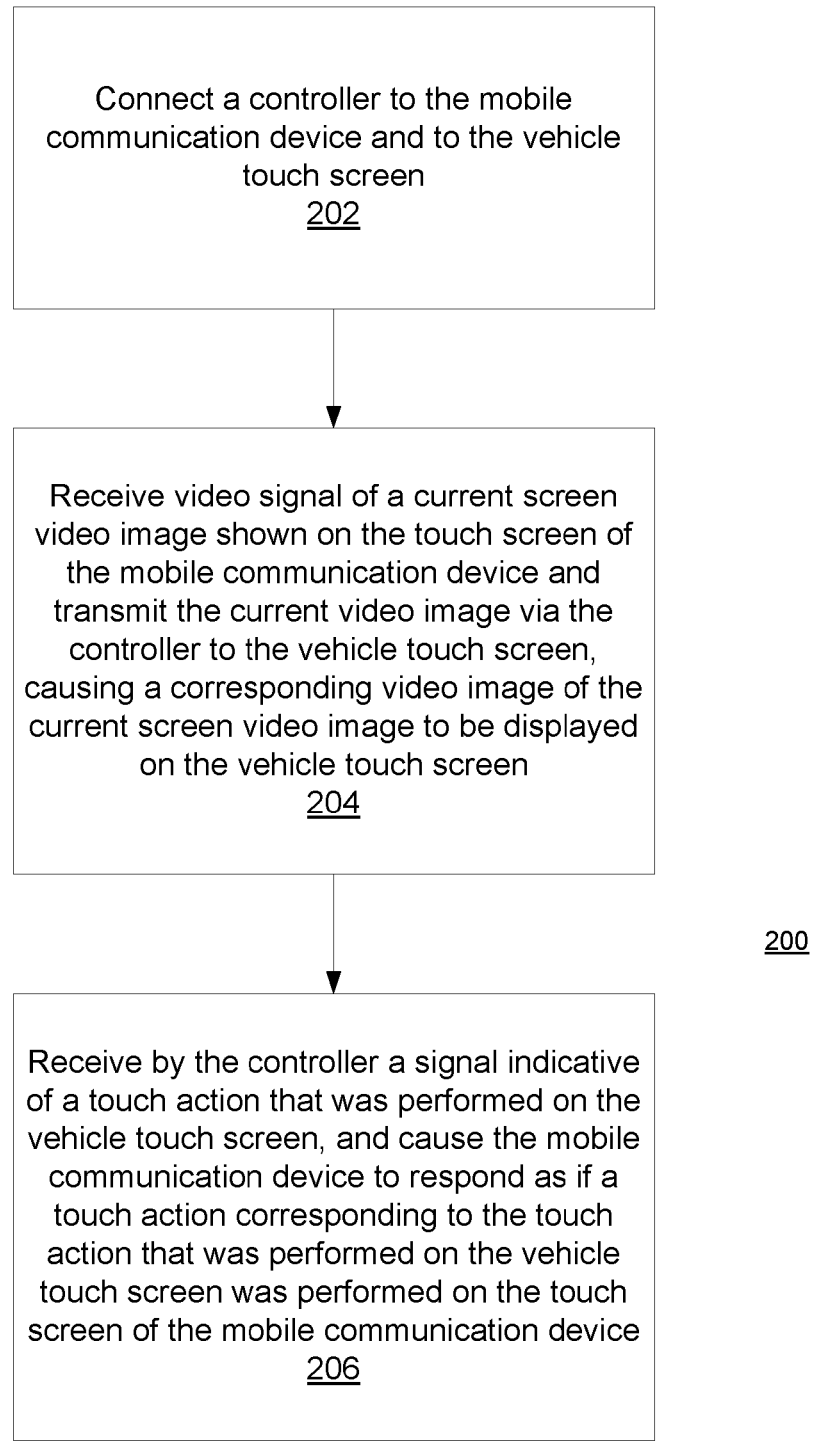
FIG. 2 illustrates a method of promoting connectivity between a mobile communication device having a touch screen and a vehicle touch screen installed in a vehicle, according to an embodiment of the present invention.

FIG. 2 illustrates a method of promoting connectivity between a mobile communication device having a touch screen and a vehicle touch screen installed in a vehicle, according to an embodiment of the present invention.

Method 200 may include connecting 202 a controller to the mobile communication device and to the vehicle touch screen. Method 200 may also include receiving 204 video signal of a current screen video image shown on the touch screen of the mobile communication device and transmitting the current video image via the controller to the vehicle touch screen, causing a corresponding video image of the current screen video image to be displayed on the vehicle touch screen. Method 200 may further include receiving 206 by the controller a signal indicative of a touch action that was performed on the vehicle touch screen, and causing the mobile communication device to respond as if a touch action corresponding to the touch action that was performed on the vehicle touch screen was performed on the touch screen of the mobile communication device.

Figure 3:
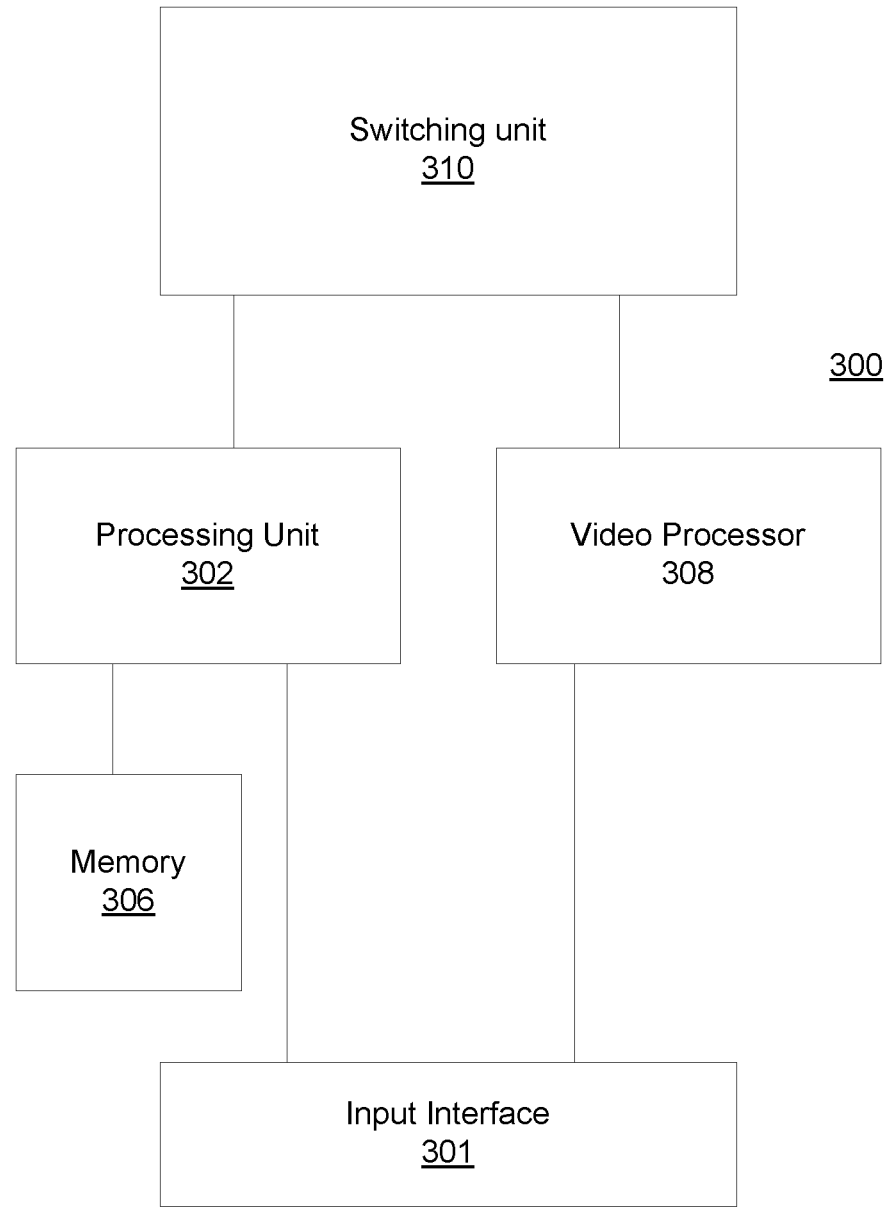
FIG. 3 illustrates a controller of a system for promoting connectivity between a smartphone and a touch screen of a vehicle, in accordance with an embodiment of the present invention.

FIG. 3 illustrates a controller 300 of a system for promoting connectivity between a smartphone and a touch screen of a vehicle, in accordance with an embodiment of the present invention.

Controller 300 may include a processing unit 302 (e.g. one or a plurality of processors, on a single machine or distributed on a plurality of machines) for executing a method according to embodiments of the present invention. Processing unit 302 may be linked with memory 306 on which a program implementing a method according to embodiments of the present invention and corresponding data may be loaded and run from, and video processor 308, for processing the video signal received via the input interface 301 (e.g. convert video format and/or resolution if the input video signal to a suitable video format and/or resolution for the vehicle touch screen).

which includes a non-transitory computer readable medium (or mediums) such as, for example, one or a plurality of hard disks, flash memory devices, etc. on which data (e.g. dynamic object information, values of fields, etc.) and a program implementing a method according to examples and corresponding data may be stored. System 300 may further include switching unit 304 configured to be connected between a media bus of the vehicle and the vehicle touch screen. System 300 may also include input device 301, such as, for example, one or a plurality of keyboards, pointing devices, touch sensitive surfaces (e.g. touch sensitive screens), etc. for allowing a user to input commands and data.

Examples may be embodied in the form of a system, a method or a computer program product. Similarly, examples may be embodied as hardware, software or a combination of both. Examples may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Examples are described hereinabove with reference to flowcharts and/or block diagrams depicting methods, systems and computer program products according to various embodiments.

Features of various examples discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the disclosure.

The invention claimed is:

1. A system for promoting connectivity between a mobile communication device (MCD) having a touch screen, a video source, and a vehicle touch screen installed in a vehicle, the system comprising:
   a switching unit in a single enclosure having a first connector for connecting to the MCD, a second connector for connecting to the video source, and a third connector for connecting to the vehicle touch screen, the switching unit is operative in a first state to pass video data between the first and third connectors and in a second state to pass video data between the second and third connectors; and
   a controller comprising a processor coupled to the switching unit,
   wherein the system is configured in the first state to connect between the mobile communication device and the vehicle touch screen and to receive a video image of a current screen video image shown on the touch screen of the mobile communication device and transmit the current video image to the vehicle touch screen, for displaying the video image of the current screen video image on the vehicle touch screen, and
   to receive a signal indicative of a touch action that was performed on the vehicle touch screen and to transmit the signal to the MCD, for the MCD to respond to the touch action according to the response to the same touch action on the touch screen of the MCD
   and wherein the system is configured in the second state to receive video data from the video source and transmit the received video data to the vehicle touch screen for displaying the received video data on the vehicle touch screen.

2. The system of claim 1, wherein the controller is configured to operate the switching unit.

3. The system of claim 1, wherein the controller is configured to intercept communications from one or a plurality of vehicle communication buses of the vehicle.

4. The system of claim 3, wherein the one or a plurality of vehicle communication buses is selected from the group consisting of: Engine Control Module (ECM), transmission bus, airbags bus, antilock braking systems bus, cruise control bus, electric power steering bus, media bus, windows bus, doors bus, and mirror adjustment bus.

5. The system of claim 3, wherein the controller is further configured to interpret from the intercepted communications a sensed condition as an operation command for the mobile communication device, and cause the mobile communication device to perform that operation command.

6. The system of claim 3, wherein the controller is configured to forward information related to the vehicle to the mobile communication device.

7. The system of claim 3, wherein the controller is configured to interpret from the intercepted communications an operation of one or a plurality of human-machine interface devices of the vehicle as an operation command for the mobile communication device, and cause the mobile communication device to perform that operation command.

8. The system according to claim 3, wherein at least one of the vehicle communication buses bus is according to, or based on, Controller Area Network (CAN) bus standard.

9. The system according to claim 1, wherein the controller is housed in the single enclosure.

10. The system according to claim 1, wherein the MCD consists of, comprises, or uses, a portable device that includes the touch screen for displaying images and for receiving commands or information from the user using a Graphical User Interface (GUI), and the portable device is operative for transmitting and receiving information over a wireless networks.

11. The system according to claim 1, further comprising a cradle for mechanically docking and electrically connecting to the MCD, and wherein the first connector is part of the cradle.

12. The system according to claim 1, wherein the vehicle touch screen is mounted onto the vehicle dashboard for displaying images to the vehicle driver or to a passenger seating in the vehicle.

13. A method of promoting connectivity between a mobile communication device (MCD) having a touch screen, a video source, and a vehicle touch screen installed in a vehicle, the method comprising:
   connecting a switching unit for switching video data to the vehicle touch screen from the MCD and the video source;
   connecting a controller that comprises a processor to the switching unit for causing the switching unit to be in first and second states;
   switching, in the first state using the switching unit, a live link between the vehicle touch screen and the mobile communication device;
   receiving in the first state a video image of a current screen video image shown on the touch screen of the mobile communication device and transmitting the current video image via the switching unit to the vehicle touch screen, so that video image of the current screen video image be displayed on the vehicle touch screen;
   receiving in the first state by the switching unit a signal indicative of a touch action that was performed on the vehicle touch screen;
   causing in the first state the mobile communication device to respond to the touch action according to the response to the same touch action on the touch screen of the mobile communication device;
   receiving in the second state video data from the video source; and
   transmitting in the second state the received video data to the vehicle touch screen for displaying thereon.

14. The method of claim 13, further comprising configuring the controller to operate the switching unit.

15. The method of claim 13, further comprising:
   intercepting communications, by using the controller, from one or a plurality of vehicle communication buses of the vehicle.

16. The method of claim 15, further comprising, interpreting from the intercepted communications a sensed condition as an operation command for the mobile communication device, and causing the mobile communication device to perform that operation command.

17. The method of claim 15, further comprising forwarding by the controller information related to the vehicle to the mobile communication device.

18. The method of claim 15, further comprising interpreting from the intercepted communications an operation of one or a plurality of human-machine interface devices of the vehicle as an operation command for the mobile communication device, and causing the mobile communication device to perform that operation command.

\* \* \* \* \*